July 10, 1934.  O. B. UNDERWOOD  1,965,678
MACHINE FOR SEALING CONTAINERS UNDER VACUUM
Filed July 24, 1931  2 Sheets-Sheet 2
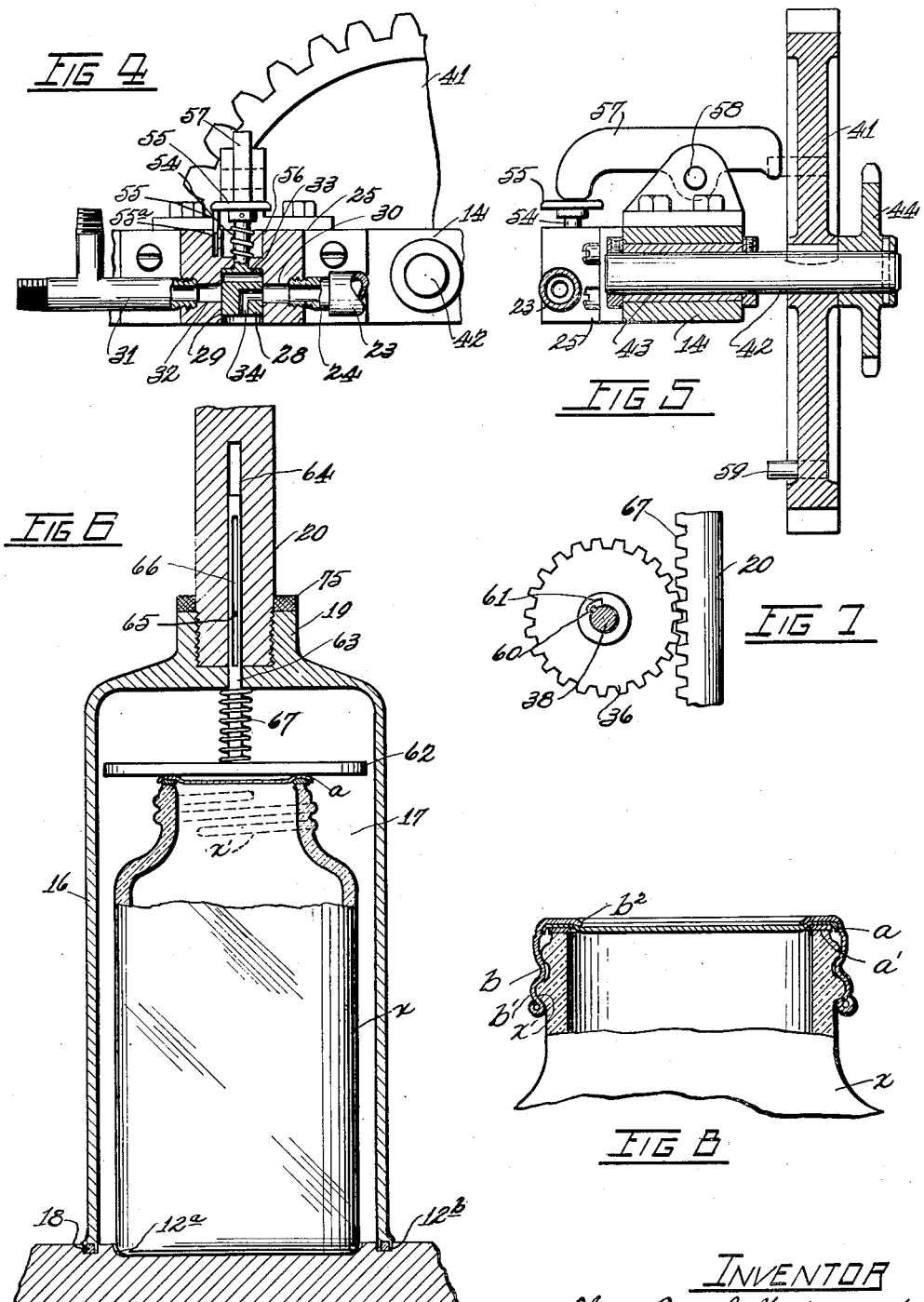

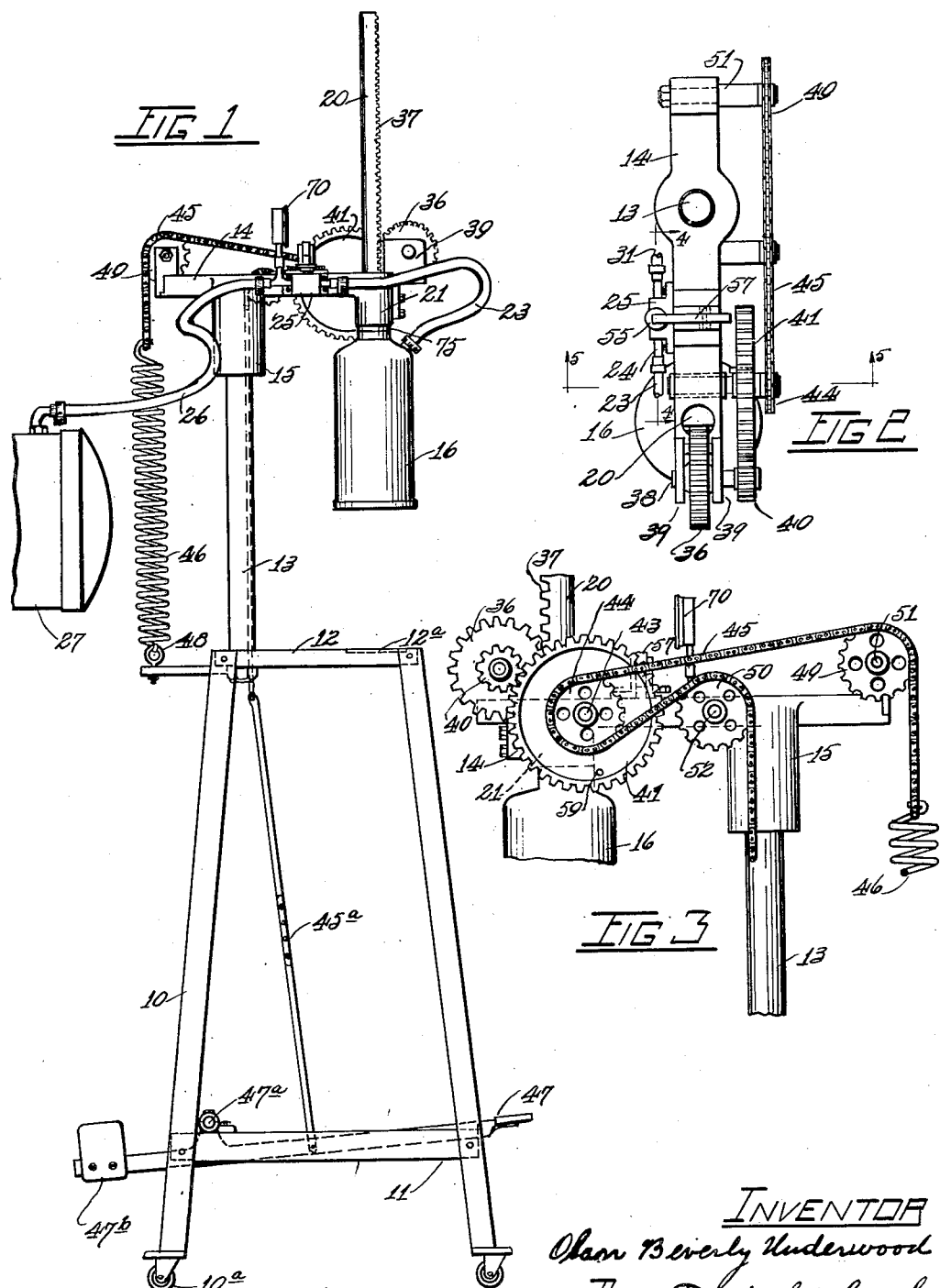

Patented July 10, 1934

1,965,678

UNITED STATES PATENT OFFICE 1,965,678

MACHINE FOR SEALING CONTAINERS UNDER VACUUM

Olan Beverly Underwood, Evansville, Ind., assignor to Bernardin Bottle Cap Co., Evansville, Ind., a corporation of Indiana Application July 24, 1931, Serial No. 552,908

12 Claims. (Cl. 226—82)

The present invention relates to machines for sealing, under vacuum, containers or jars for food and similar products and its object is to provide a machine for this purpose which is generally an improvement upon, and is easier to operate than previously designed machines of the same general character, and is particularly adapted for use in applying a sheet metal disk with a marginal sealing washer to a container under vacuum preparatory to application to the container of a screw ring for securing the disk in place on the container.

Another object of the invention is to provide a machine of the character under consideration which consists of but a small number of parts and may be manufactured at a low and reasonable cost.

Other objects of the invention will be apparent from a consideration of the following detailed description.

The invention consists in the several novel features which are hereinafter set forth and are more particularly defined by claims at the conclusion hereof.

In the drawings: Fig. 1 is a side elevation of a machine embodying the invention. Fig. 2 is a plan. Fig. 3 is a side elevation illustrating the gearing for raising and lowering the casing which forms a vacuum chamber around the jar. Fig. 4 is a detail section through the valve for controlling the vacuum in the chamber in which the jar is held. Fig. 5 is a section on the line 5—5 of Fig. 3. Fig. 6 is a section showing the vacuum chamber closed around the container. Fig. 7 is a detail illustrating the lost motion connection between the gear which meshes with the rack for raising and lowering the casing and its shaft to cause the valve for controlling the vacuum chamber for the jar to release the vacuum in the chamber before the casing is raised to permit of the removal of the sealed jar and to defer the opening of the valve to exhaust the air from the chamber until after the casing has been lowered over the jar. Fig. 8 is a section of the jar showing the completed seal with the screw-ring applied for locking the disk on the neck of the jar.

The machine which forms the subject matter of the invention embodies a supporting structure which comprises four legs 10 secured together near their lower ends by bars 11, and a bed or base plate 12. A round standard 13 has its lower end secured in plate 12. A bracket 14 has a depending socket 15 which is fixedly secured to the upper end of said standard. A recess 12$^a$ is formed in the upper face of plate 12 to receive and properly position a jar $x$ for sealing. A cylindrical casing 16 is adapted to surround and extend over the jar to form a vacuum chamber 17 around the jar. An annular groove 12$^b$ is formed in the upper face of plate 12 to receive the lower end of the casing 16. A packing ring 18 is fitted in the lower end of the casing 16 to form an air-tight closure between the casing plate 12 when the casing is in its lowermost position. A socket 19 is formed on the upper end of casing 16, and is screw-threaded to a rod 20 which is slidable vertically in a socket 21 formed at the front of bracket 14. The casing 16 is movable to permit it to be raised, so the jar $x$ can be placed in position to be sealed, and to be lowered so the casing will form an enclosed chamber around the jar when the jar is to be vacuumized. The casing 16 is normally held in its raised position, and is adapted to be lowered by mechanism hereinafter described.

A flexible tube 23 is connected to the casing 16 and to a nipple 24 which is connected to an extension block 25 on supporting bracket 14. Flexible tube 26 is connected by a nipple 31 to said block and to a vacuum tank 27. A vertically slidable valve 28 is mounted in a socket 29 in block 25 and serves to control the flow of air from the chamber 17 in casing 16 to the vacuum tank 27 and to atmosphere. Nipple 24 communicates with a port 30 in the block 25 and leads to one side of the valve socket 29. Nipple 31 communicates with a port 32 which leads to the opposite side of valve socket 29. Valve 28 is provided with a through port 33 which, when the valve is shifted in its lowered position, establishes communication between ports 32 and 30, to exhaust the air from chamber 17 when it is placed in communication with the vacuum tank 27. Valve 28 is also provided with an angular port 34 which, when the valve is raised, connects the port 30 with atmosphere, so that the vacuum in the chamber 17 will be released when the valve is raised. This valve is operated in timed relation with respect to the movements of the casing 16, so that it will be shifted to establish communication between the vacuum tank 27 and chamber 17 when the casing 16 has been seated on the plate 12 to close the vacuum chamber, so that it will form a sealing operation and be raised to open the chamber 17 to atmosphere before the casing is raised. The mechanism for shifting the casing 16 comprises a pinion 36 which meshes with rack-teeth 37 on the rod 20 which carries the casing 16; a shaft 38, journalled in bearings 39, carried by the bracket 14; a pinion 40 fixed to shaft 38; a gear 41 fixed to a shaft 42 which is journalled in a bearing 43 in bracket 14; a sprocket-wheel 44 fixed to shaft 42; a sprocket chain 45 to one end of which a retracting spring 46 is connected; and a foot lever 47 to which the other end of the chain is connected by an adjustable link 45ª. Lever 47 is pivoted to the supporting frame at 47ª, and is provided with a counterweight 47ᵇ. The supporting frame may be mounted on casters 10ª, so that it can be conveniently moved from place to place. The lower end of spring 46 is connected at 48 to the supporting frame and the chain 45 passes around idler sprockets 49 and 50 which are rotatably mounted on transverse stud shafts 51 and 52 respectively. Spring 46 yieldingly and normally holds the chain 45 to keep the lever 47 raised and the gearing to hold the casing 16 in its raised position. When the pedal 47 is depressed one end of the chain 45 will be pulled downwardly to rotate the sprocket 44 against the force of spring 46. Sprocket 44 will then rotate gear 41, pinion 40 and gear 36 to lower the rack rod 20 until the casing 16 is seated in groove 12ᵇ on the plate 12.

Valve 28 is provided with an upwardly projecting stem 54 and a button 55 is fixed to the upper end of the stem. A spring 56, coiled around stem 54, holds the valve 28 normally raised. A pin 55ª, depending from a button 55, slides in a socket 55ᵈ to hold the valve against rotation. A lever 57 for lowering valve 28 is pivoted at 58 to a lug which is fixed to the supporting bracket 14. One end of this lever is adapted to engage the button 55 to lower the valve. A pin or abutment 59 on gear 41 is adapted to strike and lift the other end of the lever to operate it to force the valve 28 downwardly.

A lost motion connection is provided between shaft 38 and gear 36 to permit the lever 47, chain 45, sprocket 44, gear 41 and pinion 40 to travel a sufficient distance to permit abutment 59 to operate lever 57 and valve 28 after the casing 16 is seated on the plate to close the chamber 17 so that the valve will not be opened to subject the chamber 17 to suction until the chamber has been completely closed. This lost motion connection consists of a key 60 fixed to shaft 38 and a segmental groove 61 in the hub of gear 36. When the casing 16 is raised, its weight, acting through rack-teeth 37, will hold gear 36 so that one end of groove 61 will engage the key 60 on shaft 38. When the foot-lever 47 is depressed, the weight of the casing 16 will keep the gear 36 and the key 60 in the same relation, until the casing 16 seats on the plate 12. Further movement of the lever 47 will then cause the chain 45 to rotate gear 41 a sufficient distance to cause the abutment 59 to operate lever 57 to depress the valve 28. This causes the valve 28 to connect the chamber 17 to the vacuum tank 27 after the chamber 17 has been closed by the seating of the casing 16 on the plate 12. The groove 61 in the wheel 36 permits the gear 41 to move after the casing is seated. When the lever 47 is released after the jar has been sealed, the initial upward movement will cause the gear 41 to move independently of gear 36 and rack 37, and during this initial movement, abutment 59 will release the lever 57 to permit spring 56 to restore the valve to its normal position, so it will cut off communication between the vacuum chamber 17 and the vacuum tank 27. During this movement, rib 60 on shaft 38 will travel in groove 61 of wheel 36, and after the valve 28 has been restored to its normal position, the rib 60 will engage the gear 36 to raise the casing 16. During this movement of the valve, the port will be placed in communication with the port 30 to permit air to enter the chamber 17 and break the vacuum, so that the casing 16 will be released for upward movement.

A plunger or head 62 is carried by a stem 63 which is slidable vertically in a socket 64 formed in the rod 20. A pin 65, extending through a slot 66 in stem 63, limits the downward movement of the head 62. A spring 67 normally presses the head downwardly. This head is adapted to bear on and exert sufficient pressure against a sealing disk $a$, so that when the air is drawn from the jar $x$ during the vacuumizing operation, the disk will not be displaced from the jar. Disk $a$ is provided on its underside with a sealing washer or ring $a'$ held in an annular groove formed in the underside of the disk and adapted to form a tight seal between the disk and the top of the jar. The jar $x$ is provided with a male thread $x'$ and a ring $b$ provided with a screw-thread $b'$ for engaging the thread on the jar, and an inwardly projecting top flange $b^2$ to lap the margin of the disk $a$ is adapted to lock the disk in its sealing position after the jar has been vacuumized.

A washer 75 of rubber or yielding material is provided at the upper end of the casing 16 to cushion it when it strikes the socket 21 during the retraction of the casing.

A gauge 70 is connected to the nipple 31 so that the operator can ascertain the degree of vacuum in the vacuum chamber 17 during a sealing operation.

The operation of the machine is as follows: A filled jar $x$ to be sealed with a disk $a$ and its sealing washer $a'$ adhering thereto on the top thereof is placed in the pocket 12ª on the base or plate 12. The operator will then depress foot-lever 47 which will operate a chain 45 to operate the gearing 44, 41, 40, 36, and rack 37 to lower the casing until it is seated on the plate 12 to close the vacuum chamber 17 around and over the jar $x$. As the casing is lowered, spring-pressed head 62 will engage the metal disk $a$ to hold it on the jar during the sealing operation. After the casing has been thus seated, pin 59 will strike lever 57 to depress the valve 28 and bring the valve-port 33 into position to establish communication between the vacuum chamber 17 and vacuum tank 27 through flexible tube 23, nipple 24, port 30, valve port 33, port 32 fitting 31 and hose 26. The operator will keep his foot on the lever 47 until the gauge 70 indicates that the chamber 17 has been vacuumized to the desired degree to exhaust air from the jar $x$. Next, the operator will release lever 47 and the initial movement of the chain 45 will operate the gear 41 independently of gear 36 by reason of the lost motion connection 60, 61 between shaft 38 and gear 36. During this initial independent movement of gear 41, abutment 59 will release lever 57 so that spring 56 will lift the valve 38 to cut off communication between the chamber 17 and the vacuum tank, and simultaneously bring port 34 into registry with port 30 to permit air to enter the chamber 17 and release the casing from suction, so that it will be free to be raised by the power stored in spring 46 during the remainder of the retractile movement of the lever 47. The disk $a$ will then be firmly held on the jar by the vacuum in the jar. Next, the jar will be washed or cleaned to remove any of the food which has been spilled on the jar in the filling, or during the sealing operation. Next, the ring $b$ is screwed onto the jar to hold and lock firmly the disk $a$ with its sealing washer $a'$ on the jar.

The invention exemplifies a machine for carrying out a method of sealing containers or jars in which a metallic disk or cap with a sealing washer is applied under vacuum and held thereon by the vacuum in the container, and in which a screw-ring is applied to lock the disk on the container after the disk has been applied under vacuum. This makes it possible to clean the jar after it has been sealed under vacuum, and to apply the screw-ring to the cleaned jar, so there will be no spill or food between the ring and the jar. This also facilitates the removal of the ring when it is desired to open the container, because the ring is not held by the vacuum in the container. When the ring is unscrewed from the container, the disk $a$ can be easily pryed off the container, the disk having a down-turned outer flange $a^2$ which can be engaged by a pry inserted between the flange and the uppermost screw-thread on the container. The invention exemplifies a simple and efficient machine for applying disks under vacuum, in which the disk is held on the container by a spring-pressed head during the vacuumizing, in which the casing for forming the chamber around the container is vertically movable and retracted by spring-pressure; and in which the movements of the casing and valve for controlling the suction in the chamber are operated under control of a lever and in timed relation to cause the chamber to be closed before the valve is operated to apply suction to the chamber in the casing, and to initially open the chamber to atmosphere before the casing is lifted so the container can be withdrawn.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine for sealing containers under vacuum, the combination of a support for holding a filled container, a casing mounted to move vertically and adapted to enclose and form a closed chamber around the container, a vacuum connection for the chamber, a valve for controlling the vacuum connection and admitting air to the chamber, a lever, and mechanism operable in response to shift of the lever in one direction to move the casing into position to enclose the container and then to operate the valve to subject the chamber to vacuum, and operable in response to shift of the lever in the opposite direction to operate the valve to admit air to the chamber and then to retract the casing to its open position.

2. In a machine for sealing containers under vacuum, the combination of a support for holding a container, a casing mounted to move vertically and adapted to enclose and form a chamber around the container, a vacuum connection for the chamber, a valve for controlling the vacuum connection, and gearing provided with a lost motion connection for successively shifting the casing and operating the valve.

3. In a machine for sealing containers under vacuum, the combination of a support for holding a container, a casing mounted to move vertically to and from the support, adapted to enclose and form a chamber around the container, a vacuum connection for the chamber, a valve for controlling the vacuum connection, a lever, and gearing operable by the lever, and provided with a lost motion connection for successively shifting the casing and operating the valve.

4. In a machine for sealing containers under vacuum, the combination of a support comprising a base for holding a container, a casing mounted to move vertically to and from the support, adapted to enclose and form a chamber around the container, a vacuum connection for the chamber, a valve for controlling the vacuum connection, a lever, and gearing operable by the lever and provided with a lost motion connection for successively shifting the casing to close the chamber and operating the valve to subject the chamber to vacuum after the chamber has been closed, and to operate the valve to admit air to the chamber before the casing is retracted to its open position.

5. In a machine for sealing containers under vacuum, the combination of a support for holding a container, a casing mounted to move vertically and adapted to enclose and to form a chamber around the container, a vacuum connection for the chamber, a valve for controlling the vacuum connection, mechanism for shifting the casing comprising a gear, and means for operating the valve, comprising an abutment on the gear.

6. In a machine for sealing containers under vacuum, the combination of a support for holding a container, a casing mounted to move vertically and adapted to enclose and to form a chamber around the container, a vacuum connection for the chamber, a valve for controlling the vacuum connection, mechanism for shifting the casing comprising a gear, and means for operating the valve, comprising an abutment on the gear, and a lever operated by said abutment.

7. In a machine for sealing containers under vacuum, the combination of a support for holding a container, a casing mounted to move vertically and adapted to enclose and form a chamber around the container, a vacuum connection for the chamber, a valve for controlling the vacuum connection, and mechanism for shifting the casing comprising gearing, and a spring for retracting the gearing.

8. In a machine for sealing containers under vacuum, the combination of a support for holding a container, a casing mounted to move vertically and adapted to enclose and form a chamber around the container, a vacuum connection for the chamber, a valve for controlling the vacuum connection, and mechanism for shifting the casing comprising a lever, gearing operated by the lever, and a spring connected for retracting the lever and gearing.

9. In a machine for sealing containers under vacuum, the combination of a support for holding a container, a casing mounted to move vertically and adapted to enclose and form a chamber around the container, a vacuum connection for the chamber, a valve for controlling the vacuum connection, and mechanism for shifting the casing comprising a lever, a chain connected to the lever and gearing operated by the chain.

10. In a machine for sealing containers under vacuum, the combination of a support for holding a container, a casing mounted to move vertically and adapted to enclose and form a chamber around the container, a vacuum connection for the chamber, a valve for controlling the vacuum connection, and mechanism for shifting the casing comprising a lever, a chain connected to the lever, gearing operated by the chain, and a spring connected to the chain for retracting the gearing.

11. In a machine for sealing containers under vacuum, the combination of a support comprising a base for holding a container, a post secured to said support, a bracket at the top of the post, a casing mounted to slide vertically in the bracket and adapted to seat on the base to enclose and form a chamber around the container, a vacuum connection for the chamber, a valve for controlling the vacuum connection, and manually operable mechanism for shifting the casing comprising gearing mounted in said bracket, and an operating lever for the gearing.

12. In a machine for sealing containers under vacuum, the combination of a support comprising a base for holding a container, a post secured to said support, a bracket at the top of the post, a casing mounted to slide vertically in the bracket and adapted to seat on the base to enclose and form a chamber around the container, a vacuum connection for the chamber, a valve for controlling the vacuum connection, carried by said bracket, mechanism for shifting the casing comprising gearing mounted on the bracket, and means operated by said gearing for shifting the valve.

OLAN BEVERLY UNDERWOOD.